United States Patent
Chretien et al.

(10) Patent No.: US 7,828,502 B2
(45) Date of Patent: Nov. 9, 2010

(54) MOUNTING UNIT FOR THE FASTENING EYELET OF A BELT BUCKLE

(75) Inventors: Sylvain Chretien, Wissous (FR); Andreas Mohr, Amöneburg-Mardorf (DE); Karl-Eduard Lutz, Feldatal (DE); Stéphane Gombert, Claix (FR); Nicolas Cirasaro, La Buisse (FR)

(73) Assignees: Kamax-Werke Rudolf Kellermann GmbH & Co. KG, Osterode am Harz (DE); A. Raymond Et Cie, Grenoble (FR)

(*) Notice: Subject to any disclaimer, the term of this patent is extended or adjusted under 35 U.S.C. 154(b) by 69 days.

(21) Appl. No.: 12/184,292

(22) Filed: Aug. 1, 2008

(65) Prior Publication Data
US 2009/0022566 A1 Jan. 22, 2009

Related U.S. Application Data

(63) Continuation of application No. PCT/EP2007/000491, filed on Jan. 20, 2007.

(30) Foreign Application Priority Data
Feb. 2, 2006 (DE) ........................ 10 2006 004 678

(51) Int. Cl.
*F16B 21/18* (2006.01)
(52) U.S. Cl. ........................ 411/353; 411/125; 411/148; 411/525
(58) Field of Classification Search ................. 411/516, 411/525, 353, 370, 372.6, 10, 107, 112, 23, 411/125, 127, 133, 148, 158, 549, 999
See application file for complete search history.

(56) References Cited

U.S. PATENT DOCUMENTS 3,156,281 A 11/1964 Demi
(Continued)

FOREIGN PATENT DOCUMENTS

DE 100 55 405 A1 5/2002
WO WO 00/36307 6/2000

OTHER PUBLICATIONS

Search report for co-pending PCT Application No. PCT/EP2007/000491 dated May 30, 2007.
(Continued)

*Primary Examiner*—Gary Estremsky
(74) *Attorney, Agent, or Firm*—Thomas, Kayden, Horstemeyer & Risley, LLP

(57) ABSTRACT

A mounting unit (1) serves to rotatably and captively fasten a screw (2) to a mounting part (3), especially the fastening eyelet (4) of a belt buckle of an automobile, a truck or a different commercial vehicle. The mounting unit (1) includes a screw (2) including a head (5), a shank portion (6) and a threaded portion (7) including a thread (8), the shank portion (6) being arranged in a region between the head (2) and the threaded portion (7). The mounting unit (1) furthermore includes a mounting ring (10), the mounting ring (10) being arranged on the shank portion (6) not to be movable in a direction of the screw axis (11), the mounting ring (10) including at least one retaining element (13) being designed and arranged such that a mounting part (3) can be pushed over and beyond the retaining element (13) in a way that the mounting part (3) can be fastened by the retaining element (13) such that the screw (2) is arranged to be rotatable with respect to the mounting part (3) and not to be movable in the direction of the screw axis (11).

18 Claims, 19 Drawing Sheets

U.S. PATENT DOCUMENTS

| | | | |
|---|---|---|---|
| 3,217,774 A * | 11/1965 | Pelochino | 411/353 |
| 3,414,154 A * | 12/1968 | Rose et al. | 220/3.7 |
| 3,503,431 A * | 3/1970 | Whiteside et al. | 411/353 |
| 3,511,289 A * | 5/1970 | Coyle | 411/347 |
| 4,810,145 A * | 3/1989 | Villas | 411/206 |
| 5,741,101 A * | 4/1998 | Gulistan | 411/107 |
| 6,238,127 B1 | 5/2001 | Jhumra et al. | |
| 6,626,626 B2 * | 9/2003 | Hartmann et al. | 411/353 |
| 6,871,431 B2 * | 3/2005 | Schmidt | 40/200 |

OTHER PUBLICATIONS

English Translation of PCT Written Opinion of the International Searching Authority in related co-pending Application No. PCT/EP2007/000491, issued Sep. 9, 2008 (5 Pages).

* cited by examiner

MOUNTING UNIT FOR THE FASTENING EYELET OF A BELT BUCKLE

CROSS REFERENCE TO RELATED APPLICATIONS

This application is a continuation of International Application PCT/EP2007/000491 with an International Filing Date of Jan. 20, 2007 and claiming priority to co-pending German Patent Application No. 10 2006 004 678.1 entitled "Montageeinheit für die Befestigungsöse eines Gurtschlosses", filed on Feb. 2, 2006.

FIELD OF THE INVENTION

The present invention relates to a mounting unit for rotatably and captively fastening a screw to a mounting part. The present invention also relates to a mounting set for connecting a mounting part to a component by screwing.

The mounting part may be any element which in its position in which it is fixedly connected to the component by screwing is arranged to be rotatable and pivotable, respectively. Especially, the mounting part may be the fastening eyelet of a belt buckle of an automobile, a truck or any other commercial vehicle.

BACKGROUND OF THE INVENTION

A mounting unit for rotatably and captively fastening the fastening eyelet of a belt buckle (i.e. the mounting part) to a part of the interior (i.e. the component) of a commercial vehicle is generally known from commercial vehicles by DaimlerChrysler AG. The mounting unit includes a screw including a head, a shank portion and a threaded portion including a thread. The shank portion is located in a region between the head and the threaded portion. Furthermore, the mounting unit includes a washer and two mounting discs. A necessary element of the mounting unit furthermore is the mounting part without which there would be no mounting unit, but instead only five separate elements. For mounting the mounting unit, at first the washer is pushed over the shank portion of the screw. The washer includes a bore the inner diameter of which is greater than the outer diameter of the shank portion and smaller than the outer diameter of the head of the screw such that the washer contacts the contact surface of the head. Afterwards, the mounting part with its bore is moved over the screw until the mounting part contacts the washer. The inner diameter of the bore of the mounting part is also greater than the outer diameter of the shank portion of the screw. Subsequently, the first mounting disc is pushed over the screw. The first mounting disc has a stepped design in a way that it includes a first section the outer diameter of which is slightly smaller than the inner diameter of the bore of the mounting part. This first section is pushed into the bore of the mounting part. The second section has a greater outer diameter which thus contacts the outer surface of the mounting part. The captive connection of the mounting unit is realized by the second mounting disc. The second mounting disc at its inner circumference includes radial slots between which tabs are formed. During assembly of the second mounting disc, these tabs engage into the threads of the thread, and the second mounting disc is screwed onto the thread of the screw or pressed or pushed over the thread when there is a respective elastic design until it contacts the first mounting disc. In this way, it clamps the mounting part between the first mounting disc and the washer. By respectively choosing the materials, it is ensured that the required radial clearance or play between the mounting part and the mounting disc does not lead to rattle noises. The known mounting unit has a comparatively complicated design, and in addition to the screw and the mounting element, it requires three separate elements. The captive arrangement of the mounting unit is not attained until the mounting element is mounted.

Furthermore, it is known in the prior art in the automobile industry to fasten the fastening eyelet of a belt buckle (i.e. the mounting element) of an automobile or a truck to a part of the interior (i.e. the component) of the automobile and of the truck, respectively, in a rotatable way. For this purpose, no mounting unit is used. The mounting element is connected to the component by screwing using a screw and a separate resilient wave washer. The screw includes a head, a shank portion and a threaded portion including a thread. The shank portion is located in a region between the head and the threaded portion. The wave washer includes a bore having an inner diameter being greater than the outer diameter of the shank portion. At first, the wave washer is pushed upon the screw until it approximately contacts the head of the screw. The wave washer is not fixedly connected to the screw in any way. Afterwards, the fastening eyelet of the belt buckle is also pushed over the screw. In this loose position of the three elements, the screw is screwed into a bore of the component until the shoulder of the screw limiting the shank portion in a direction towards the threaded portion firmly contacts the component. The wave washer with its one side contacts the component and with its other side contacts the fastening eyelet such that the fastening eyelet is clamped. This means that the fastening eyelet is fixed between the wave washer and the head of the screw to be rotatable, but not to be movable in the direction of the axis of the screw. The elastic force of the wave washer serves to prevent rattle noises caused by the axial clearance or play of the fastening eyelet.

A mounting unit for rotatably and captively fastening a screw to a mounting part is known from German patent application No. DE 100 55 405 A1, corresponding to U.S. Pat. No. 6,626,626 B2. The assembly unit includes a screw including a head, a shank portion and a threaded portion including a thread. The shank portion is located in a region between the head and the threaded portion. The mounting unit furthermore includes a mounting ring. The mounting ring is made of plastic, and it is designed to be elastic. Furthermore, there is a mounting part including a bore and a component including a bore with an inner thread being associated with the thread of the screw. Due to the non-circular cross-section of the bore of the mounting part, the mounting ring is not rotatably arranged in the mounting part. Furthermore, due to a collar and an expanding rib, the mounting ring is arranged to be not movable with respect to the mounting part. The mounting ring has an inner diameter which is smaller than the outer diameter of the thread of the threaded portion of the screw. The mounting ring in the position of the mounting unit not being fully screwed into the component (see FIG. 1) is located in the region of the threaded portion of the screw. Due to the respective sizes of the inner diameter of the mounting ring and of the outer diameter and of the core diameter of the thread of the threaded portion of the screw, respectively, the mounting ring can be moved with respect to the screw, and the screw can be screwed or pressed into the mounting ring, respectively, due to elastic or elastic and plastic deformation. The mounting ring is not located in the region of the shank portion of the screw until assembly of the mounting part at the component has been completed, meaning when the screw has been fully screwed into the component (see FIG. 2). In this position, the mounting ring has already fulfilled its function and is no longer required in this sense. It is neither rotatable nor movable with respect to the mounting part. The mounting ring fulfills its actual function in connection with the threaded portion of the screw (see FIG. 1). This prior art reference does not relate to fixing a mounting part at a component in a way that the mounting part in its position connected to the component by screwing can be rotated with respect to the component.

Another mounting unit for rotatably and captively fastening a screw to a mounting unit is known from U.S. Pat. No. 3,156,281. The mounting unit includes a screw including a head, a shank portion and a threaded portion including a thread. A shank portion is located in a region between the head and the threaded portion. Furthermore, the mounting unit includes a mounting ring. The mounting ring is especially made of elastic spring steel. In its position in which the mounting unit is not connected to the mounting part (see FIG. 3), the mounting ring is arranged in the region of the shank of the screw to be freely movable and rotatable. The combination of the screw and the mounting ring is then introduced into the mounting part from above (see FIG. 4). The mounting ring at its outer circumference includes protruding elastic elements which serve to fasten the mounting ring in the opening of the mounting part to a certain extent. In contrast, the screw is freely rotatable with respect to the mounting ring, and it can be freely moved with respect to the mounting part and the mounting ring within the distance between the head of the screw and the end of the threaded portion facing the head of the screw. This prior art reference does not relate to fixing a mounting part at a component in a way that the mounting part in its position connected to the component by screwing can be rotated with respect to the component.

SUMMARY OF THE INVENTION

The present invention relates to a mounting unit for rotatably and captively fastening a screw to a mounting part. The mounting unit includes a screw and a mounting ring. The screw includes a head, a shank portion and a threaded portion including a thread. The shank portion is arranged in a region between the head and the threaded portion. The mounting ring is arranged on the shank portion not to be movable in a direction of the screw axis. The mounting ring includes at least one retaining element being designed and arranged such that a mounting part can be pushed over and beyond the retaining element in a way that the mounting part can be fastened by the retaining element such that the screw is arranged to be rotatable with respect to the mounting part and not to be movable in the direction of the screw axis.

The present invention also relates to a mounting set for connect a mounting part to a component by screwing. The mounting set includes a mounting part, a screw and a mounting ring. The screw includes a head, a shank portion and a threaded portion including a thread. The shank portion is arranged in a region between the head and the threaded portion, and it extends through the bore of the mounting element. The mounting ring is arranged on the shank portion not to be movable in a direction of the screw axis. The mounting ring including at least one retaining element being designed and arranged such that the mounting part is fastened by the retaining element such that the screw is arranged to be rotatable with respect to the mounting part and not to be movable in the direction of the screw axis.

With the novel mounting unit and mounting set serving for rotatably and captively fastening a screw to a mounting part, it is possible to realize a fixed connection between the mounting part and the component, while the mounting part in the mounted position is rotatable with respect to the screw and thus with respect to the component.

The novel mounting unit includes at least two elements, namely a screw and a mounting ring, which are captively connected to one another. Preferably, the mounting unit does not include additional elements. The screw and the mounting ring already form a common mounting unit which can be transported and handled without the danger of loosing one of the elements. This mounting unit is sooner or later brought in contact to a mounting part. In this mounted position, the three elements, meaning the screw, the mounting ring and the mounting part, are also captively connected to one another and form a mounting set. The mounting part is arranged to be substantially not movable with respect to the screw and to the mounting ring, respectively. This means that there is no translatory relative movement or at least no substantial translatory relative movement between the mounting part and the mounting unit. A non-movable arrangement of the screw with respect to the mounting element as used herein is to be understood as a substantially non-movable arrangement. Minor and insignificant movability in the sense of a certain clearance or play is also covered by this definition.

On the other hand, the arrangement is chosen such that a rotary relative movement between the mounting unit and the mounting part is possible. There are different possibilities of realizing the rotary relative movement between the mounting unit and the mounting part. It is possible that the mounting ring already is arranged on the screw to be rotatable with respect to the screw. In this case, the mounting part may either be located on the mounting ring to be also rotatable or in a fixed way, meaning not to be rotatable. In case the mounting ring is arranged on the screw in a way not to be rotatable, the required rotary relative movement between the mounting unit and the mounting part is realized by the mounting part being rotatable with respect to the mounting ring.

In this way, one attains a combination of a mounting unit and a mounting part (i.e. the mounting set) which with the outer thread of the threaded portion of the screw of the mounting unit can be screwed into a corresponding inner thread of a bore of a component. After having realized this fixed connection, the mounting part still is rotatable with respect to the mounting unit and thus with respect to the component. Such a fixed, but rotatable and pivotable connection, respectively, is especially suitable for fastening the fastening eyelet of a belt buckle of an automobile, a truck or a different vehicle. It is known that it is necessary for the operability of a belt system that the fastening eyelet is fixedly arranged in the interior of the vehicle to realize the desired retaining function of the belt system. The actual belt buckle is connected to the eyelet by a firm belt section. For realizing the retaining function, it is necessary that the fastening eyelet and thus the belt buckle are connected to the interior of the vehicle in a way to be rotatable and pivotable, respectively. The novel mounting unit and the novel mounting set for the first time ensure this kind of connection in the sense of a preassembled captive unit not using the separate elements as known from the prior art.

The at least one retaining element may be designed to be elastic and resilient and to protrude from the mounting ring in a way that the mounting part may be pushed over and beyond the retaining element under elastic deformation of the retaining element and to be fastenable by the retaining element after elastic springback of the retaining element. In other words, the retaining element is also designed as a snap element engaging the mounting part in the sense of a snap connection and fixing the mounting part on the mounting ring. The mounting part with its bore is pushed beyond the retaining element resulting in the retaining element being elastically deformed in the direction of the longitudinal axis of the mounting unit and being pressed towards the longitudinal axis of the mounting unit, respectively. When the mounting part has been completely pushed over and beyond the retaining element and the mounting unit has been fully introduced into the bore of the mounting part, respectively, the retaining element gets free from the inner surface of the bore of the mounting part such that it can elastically springback into its starting position. The retaining element now contacts the outer surface of the mounting part and in this way engages an undercut of the bore of the mounting part. In this position, the mounting element effectively prevents an opposite translatory relative movement between the mounting unit and the mounting part. For disassembly, the retaining element has to be pushed intentionally in the direction towards the longitudinal axis of the screw until the free end of the retaining element once again engages the bore of the mounting part. In this way, unintentional disassembly is effectively prevented. Preferably, the mounting unit does not only include one retaining element, but a plurality of retaining elements. Especially, the retaining elements are uniformly distributed about the circumference of the mounting ring. In this way, secure and uniform fastening of the mounting part to the mounting unit is ensured. Preferably, the retaining elements are arranged to protrude from the surface of the mounting ring at an angle between approximately 5° and 45°, especially between 25° and 30°.

The mounting ring may include at least one pressing element, the at least one retaining element being located in the region of the axial end of the mounting ring facing the threaded portion and the at least one pressing element being located in the region of the axial end of the mounting ring facing the head of the screw such that the mounting part can be fastened between the at least one pressing element and the at least one retaining element without axial clearance or play. The at least one pressing element realizes fastening of the mounting unit in the bore of the mounting part without clearance, play or backlash which results in rattle noises being prevented. For this purpose, the pressing element is preferably designed to be elastic and to apply an elastic force to the mounting part such that the mounting part in the mounted position is pressed towards the retaining element. In this way, the mounting part with its two outer surfaces is clamped between the pressing element and the retaining element without play, clearance or backlash and without rattle noises.

Preferably, the mounting unit does not only include one pressing element, but a plurality of pressing elements. Especially, the pressing elements are uniformly distributed about the circumference of the mounting ring.

The mounting ring may be designed as a ring not being closed in the direction of its circumference, especially as a ring made of spring steel. Such a non-closed resilient ring can be easily pushed over the screw in an automated way. There are different possibilities of axially fastening the mounting ring on the screw. A first possibility is that the screw includes a shoulder which is arranged next to the shank portion as seen in a direction of the screw axis towards the threaded portion. The shoulder has a greater outer diameter than the shank portion. After elastic widening of the mounting ring, the mounting ring then engages the shoulder which prevents translatory backward movement of the mounting ring. Alternatively or additionally, the screw may include a channel being located in the region of the shank portion, the mounting ring including at least one corresponding fixing element which engages the channel. The channel may be designed to extend about the outer circumference of the screw in an annularly closed way, or it may include a plurality of separate sections. In the first embodiment, relative rotation of the mounting ring with respect to the screw is possible without problem, while the second embodiment at least impedes such a rotation.

Preferably, the shank portion has a greater outer diameter than the threaded portion. In this way, the mounting ring can be pushed over the threaded portion of the screw towards the head of the screw without problem and without impeding handling or damaging the thread of the threaded portion. However, it is also possible that the shank portion has a smaller outer diameter than the threaded portion. In this case, for ensuring mountability of the mounting element to the mounting unit, the mounting ring has to have a greater thickness to be capable of pushing the bore of the mounting part over the thread, on the one hand, and of securely mounting it on the outer diameter of the mounting ring.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
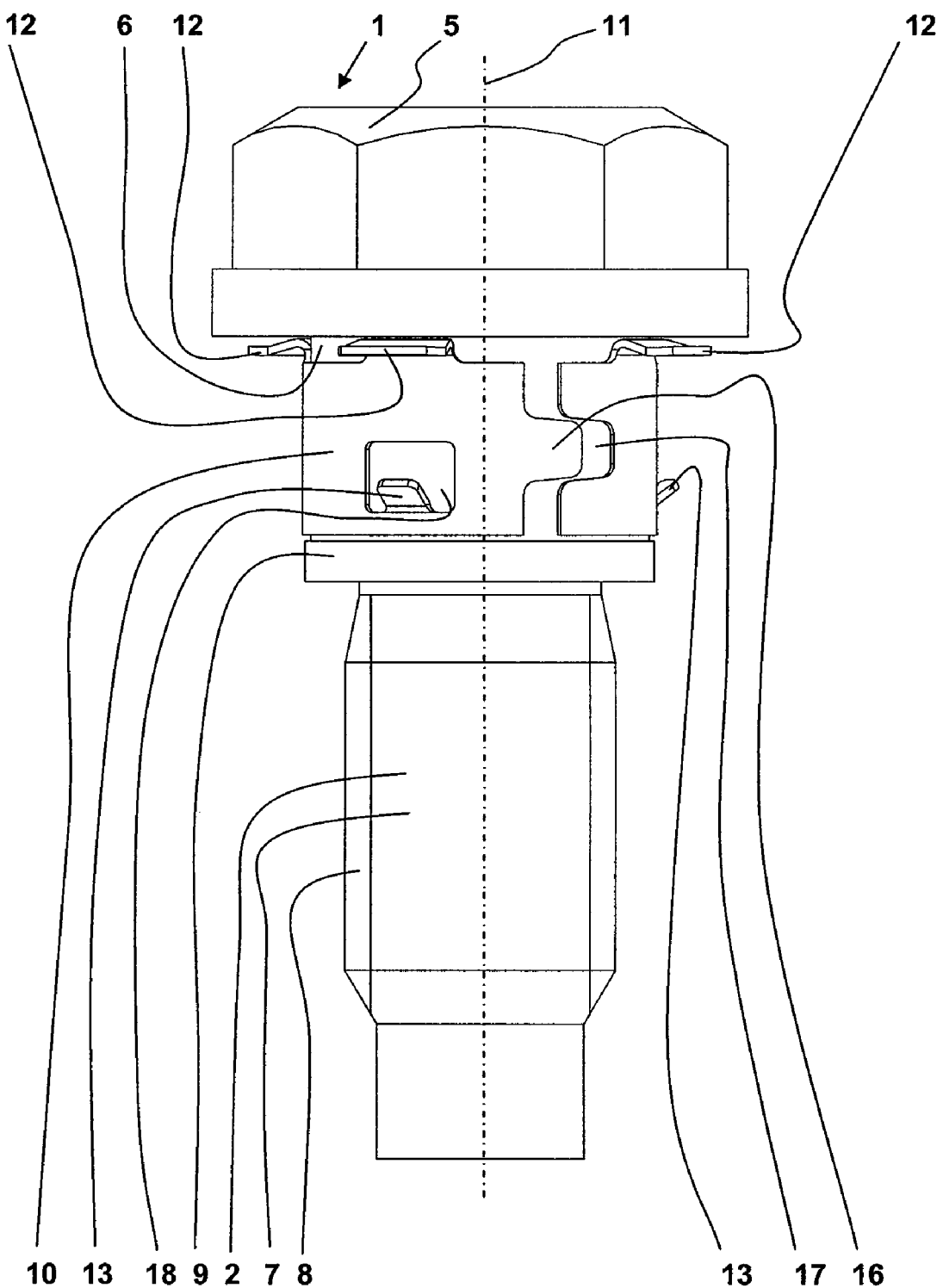
FIG. 1 is a first side view of a first exemplary embodiment of the novel mounting unit.
Figure 2:
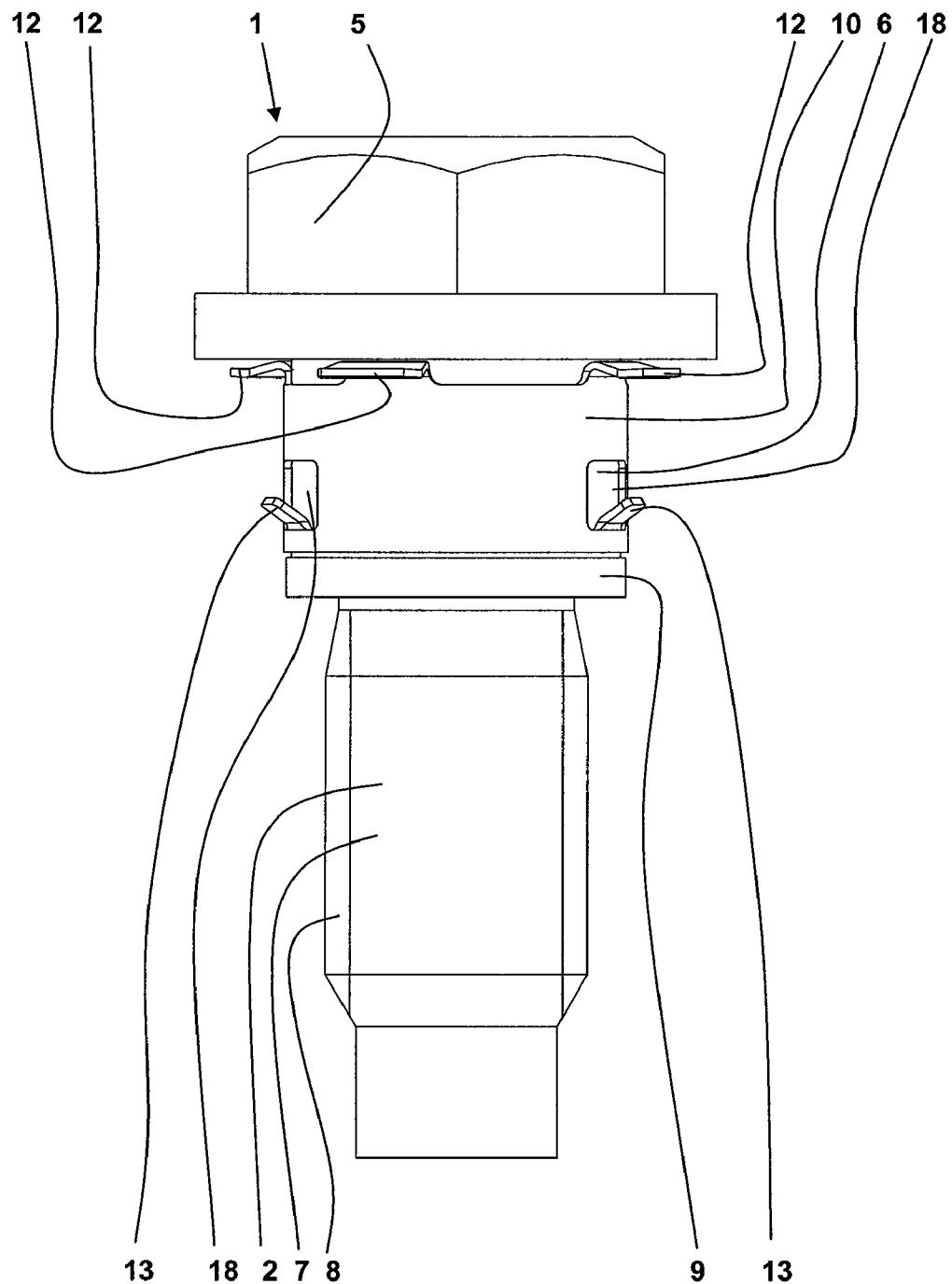
FIG. 2 is a second side view of the first exemplary embodiment of the novel mounting unit.
Figure 3:
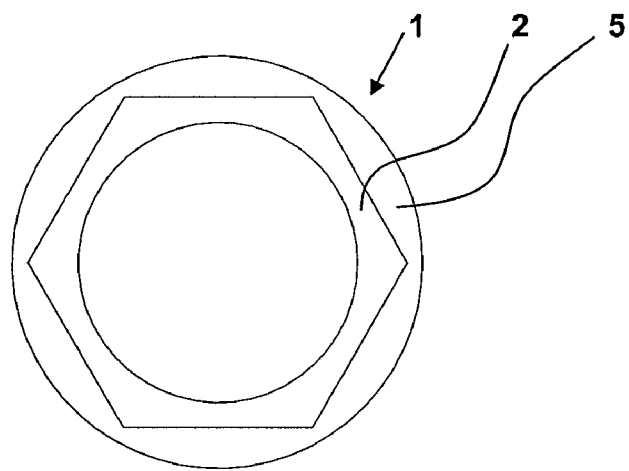
FIG. 3 is a top view of the first exemplary embodiment of the novel mounting unit.
Figure 4:
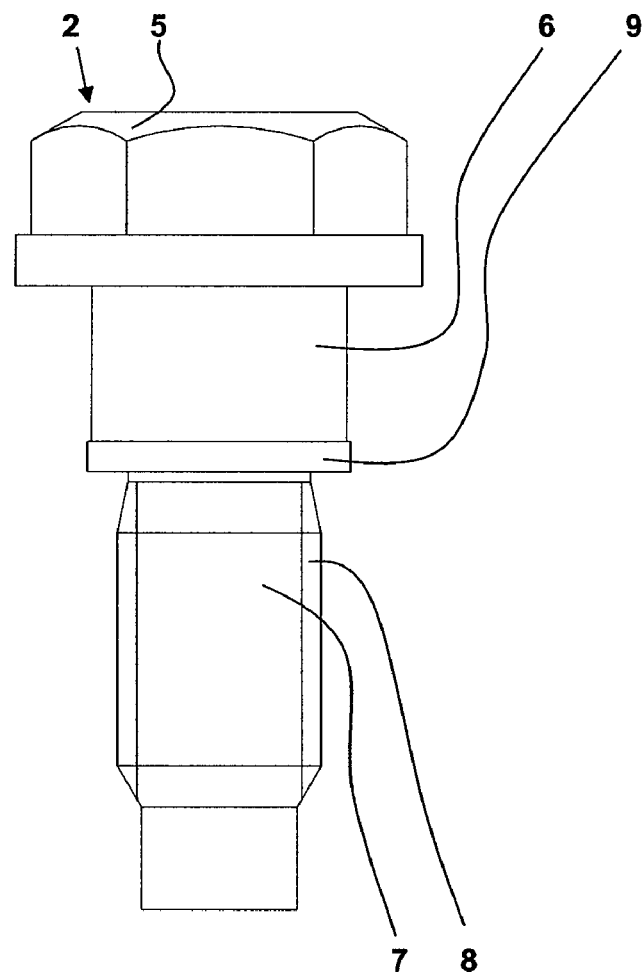
FIG. 4 is a side view of the screw of the first exemplary embodiment of the novel mounting unit.
Figure 5:
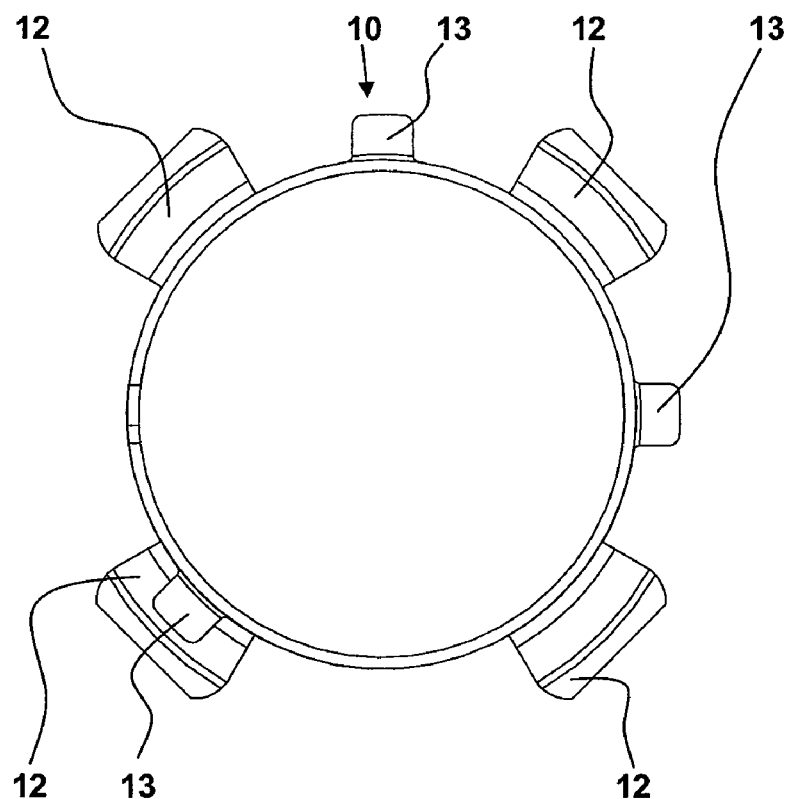
FIG. 5 is a top view of the mounting ring of the first exemplary embodiment of the novel mounting unit.
Figure 6:
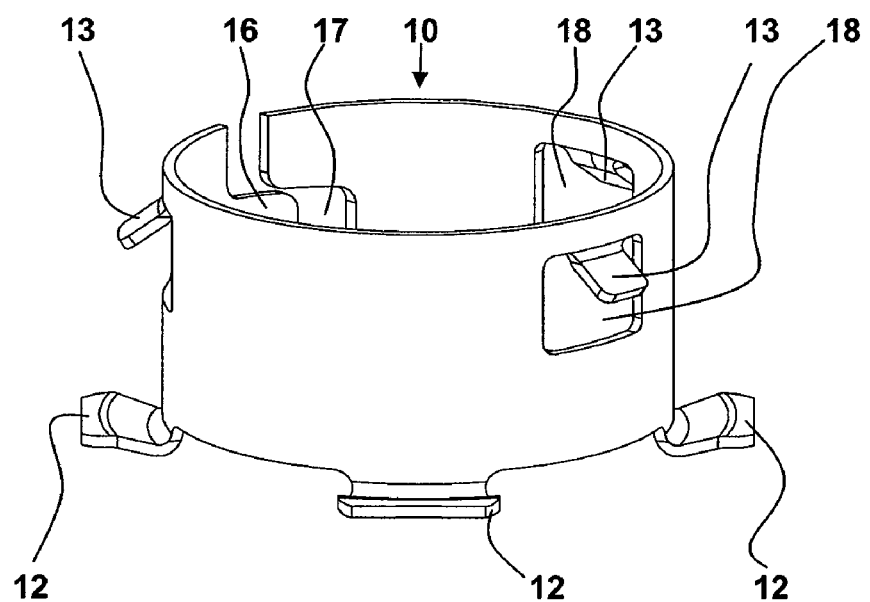
FIG. 6 is a perspective view of the mounting ring of the first exemplary embodiment of the novel mounting unit.
Figure 7:
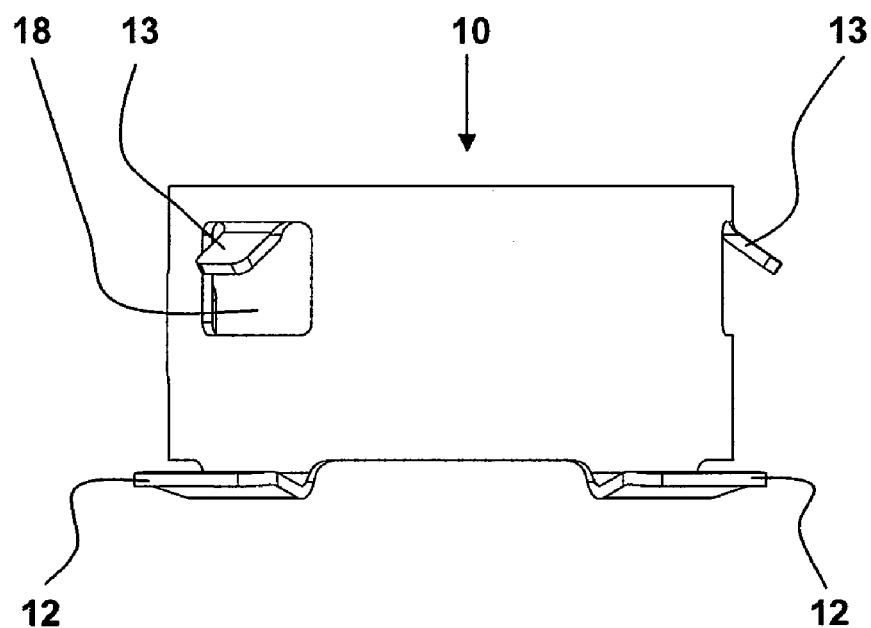
FIG. 7 is a first side view of the mounting ring of the first exemplary embodiment of the novel mounting unit.
Figure 8:
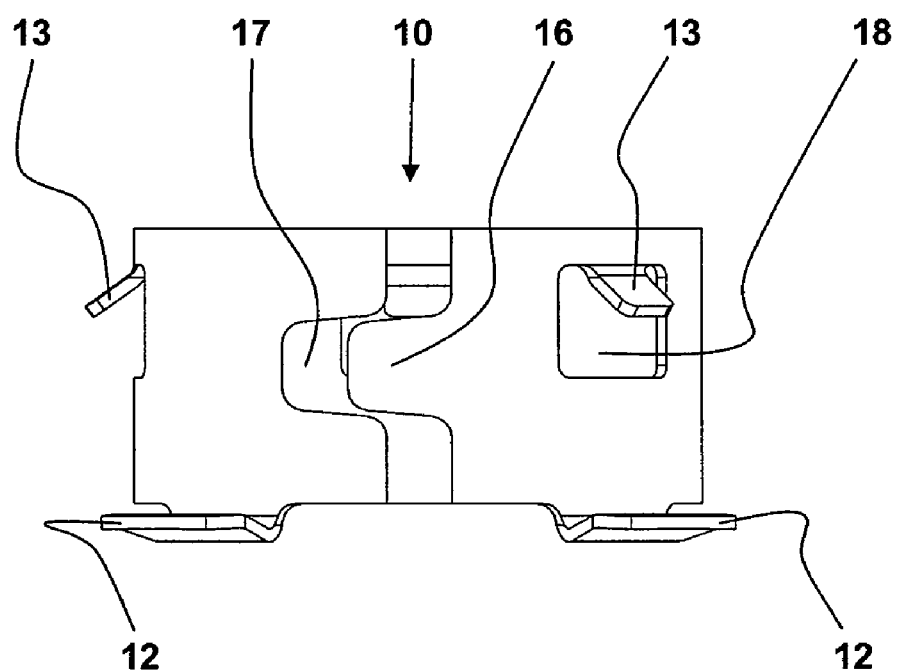
FIG. 8 is a second side view of the mounting ring of the first exemplary embodiment of the novel mounting unit.
Figure 9:
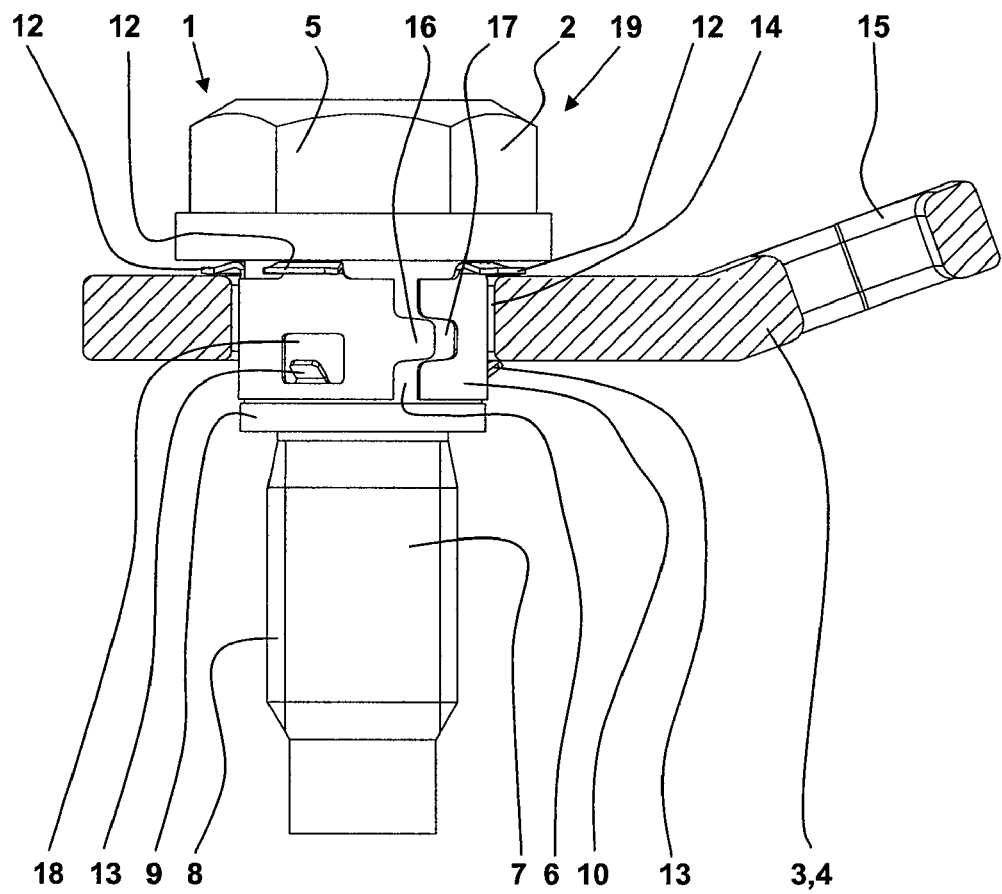
FIG. 9 is a partial sectional view of the first exemplary embodiment of the novel mounting unit being mounted in a mounting part.
Figure 10:
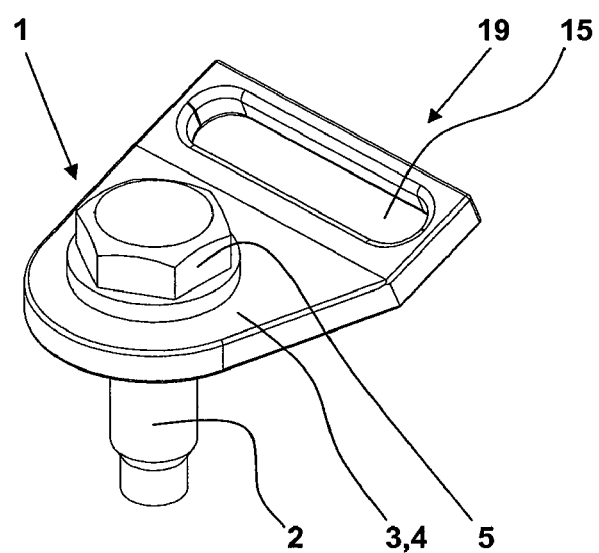
FIG. 10 is a perspective view of the first exemplary embodiment of the novel mounting unit mounted in the mounted part.
Figure 11:
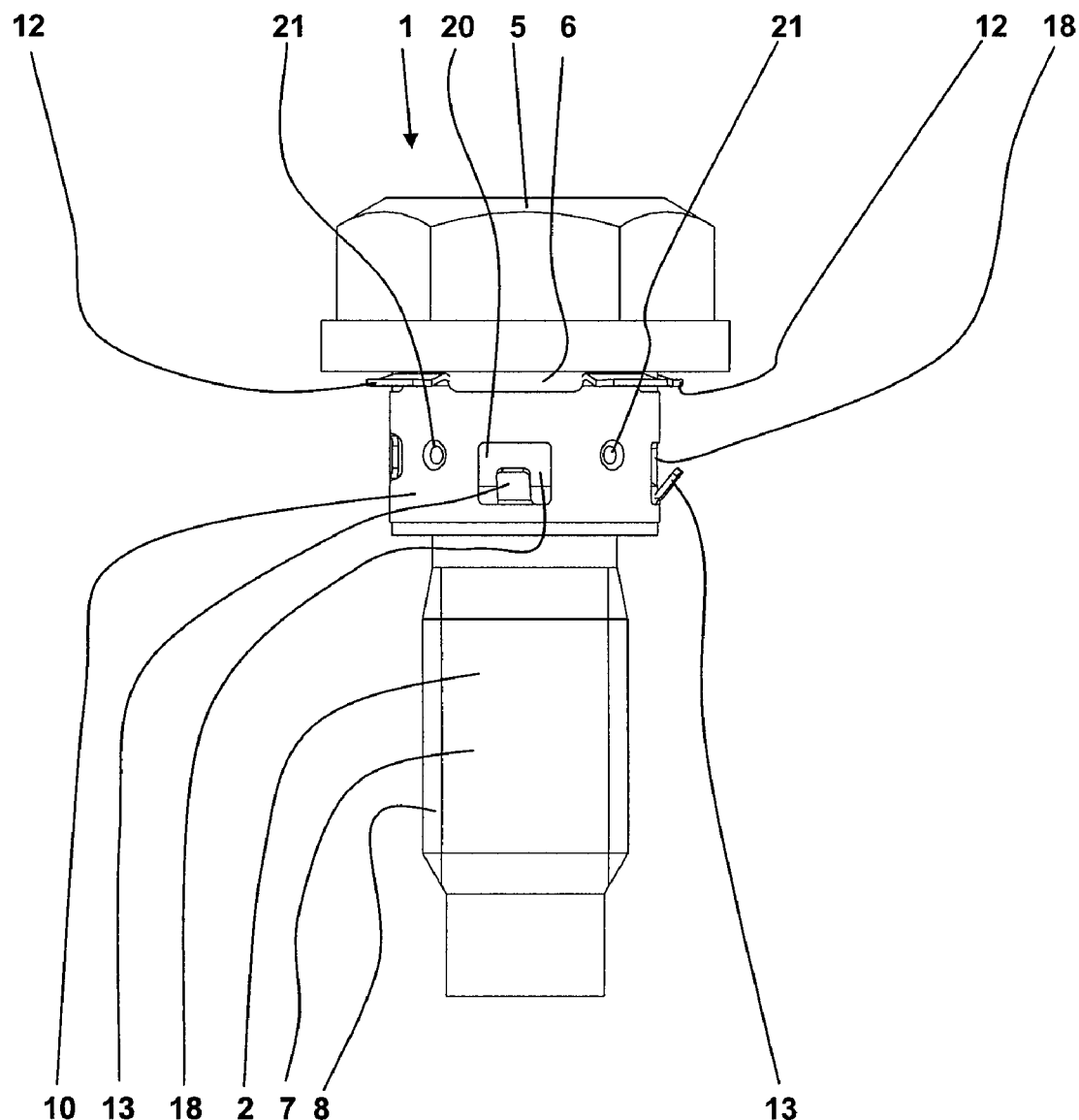
FIG. 11 is a first side view of a second exemplary embodiment of the novel mounting unit.
Figure 12:
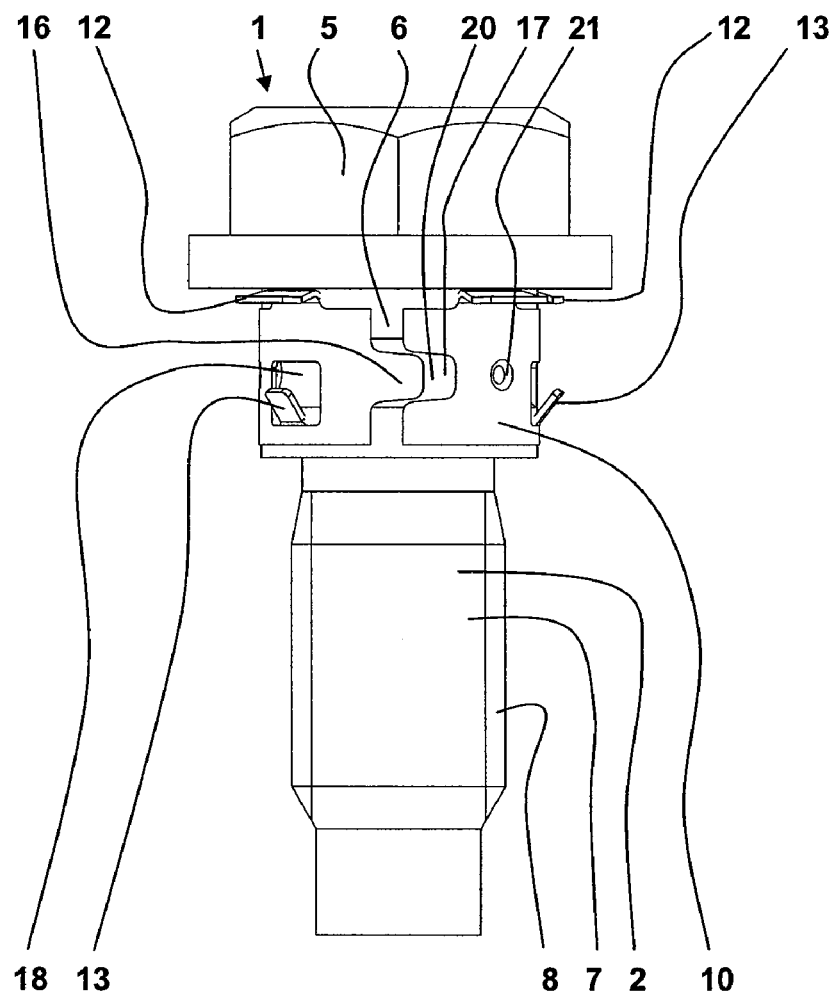
FIG. 12 is a second side view of the second exemplary embodiment of the novel mounting unit.
Figure 13:
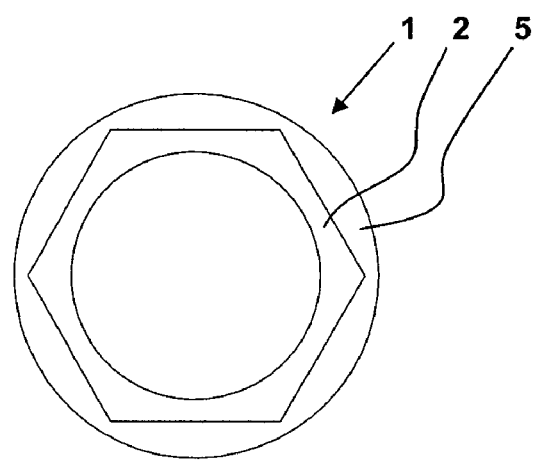
FIG. 13 is a top view of the second exemplary embodiment of the novel mounting unit.
Figure 14:
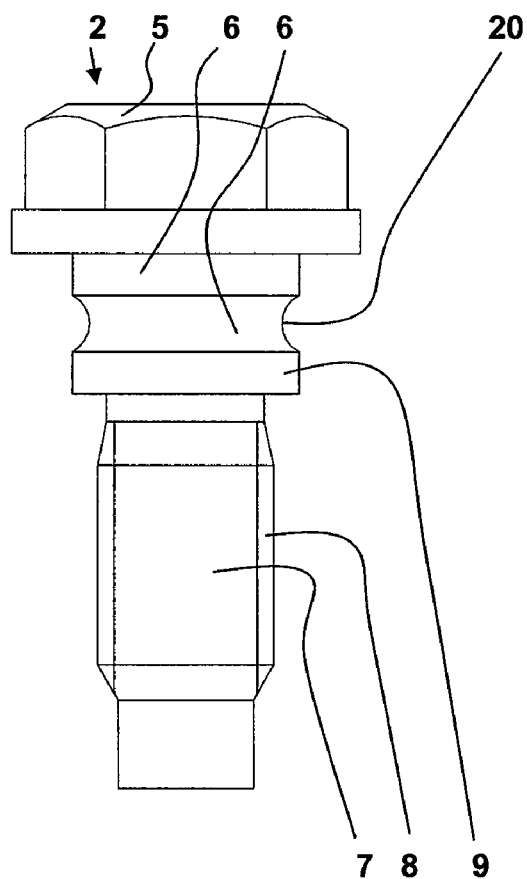
FIG. 14 is a side view of the screw of the second exemplary embodiment of the novel mounting unit.
Figure 15:
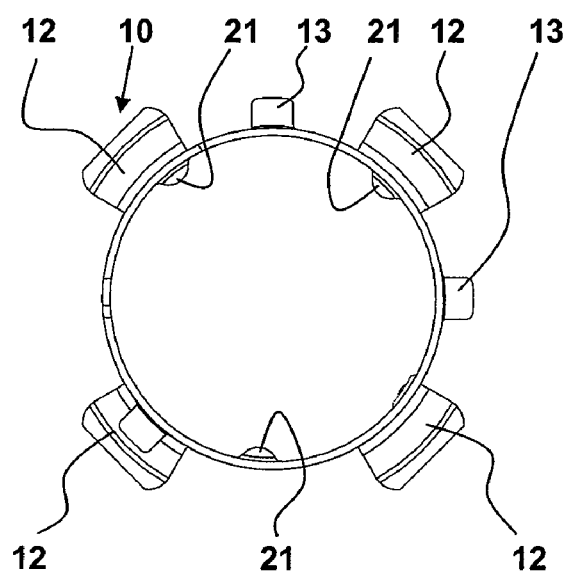
FIG. 15 is a top view of the mounting ring of the second exemplary embodiment of the novel mounting unit.
Figure 16:
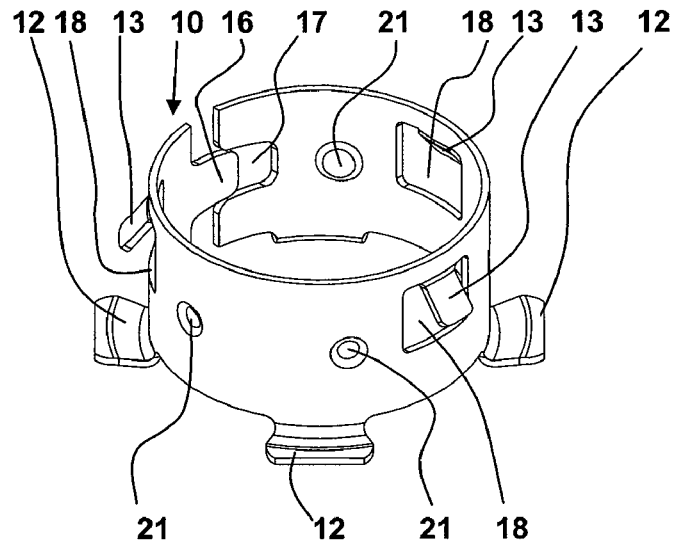
FIG. 16 is a perspective view of the mounting ring of the second exemplary embodiment of the novel mounting unit.
Figure 17:
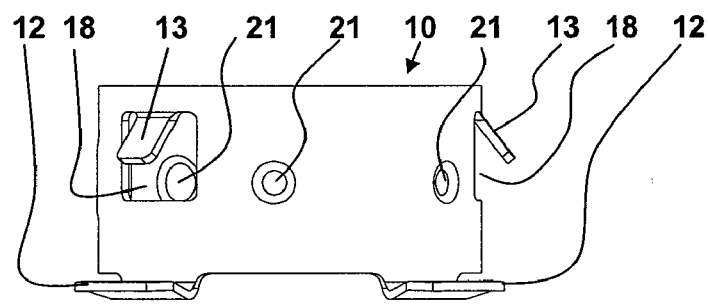
FIG. 17 is a first side view of the mounting ring of the second exemplary embodiment of the novel mounting unit.
Figure 18:
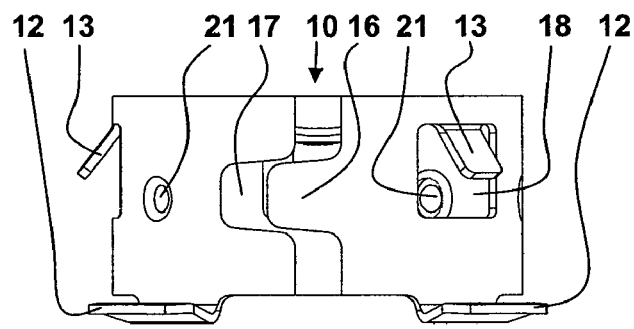
FIG. 18 is a second side view of the mounting ring of the second exemplary embodiment of the novel mounting unit.
Figure 19:
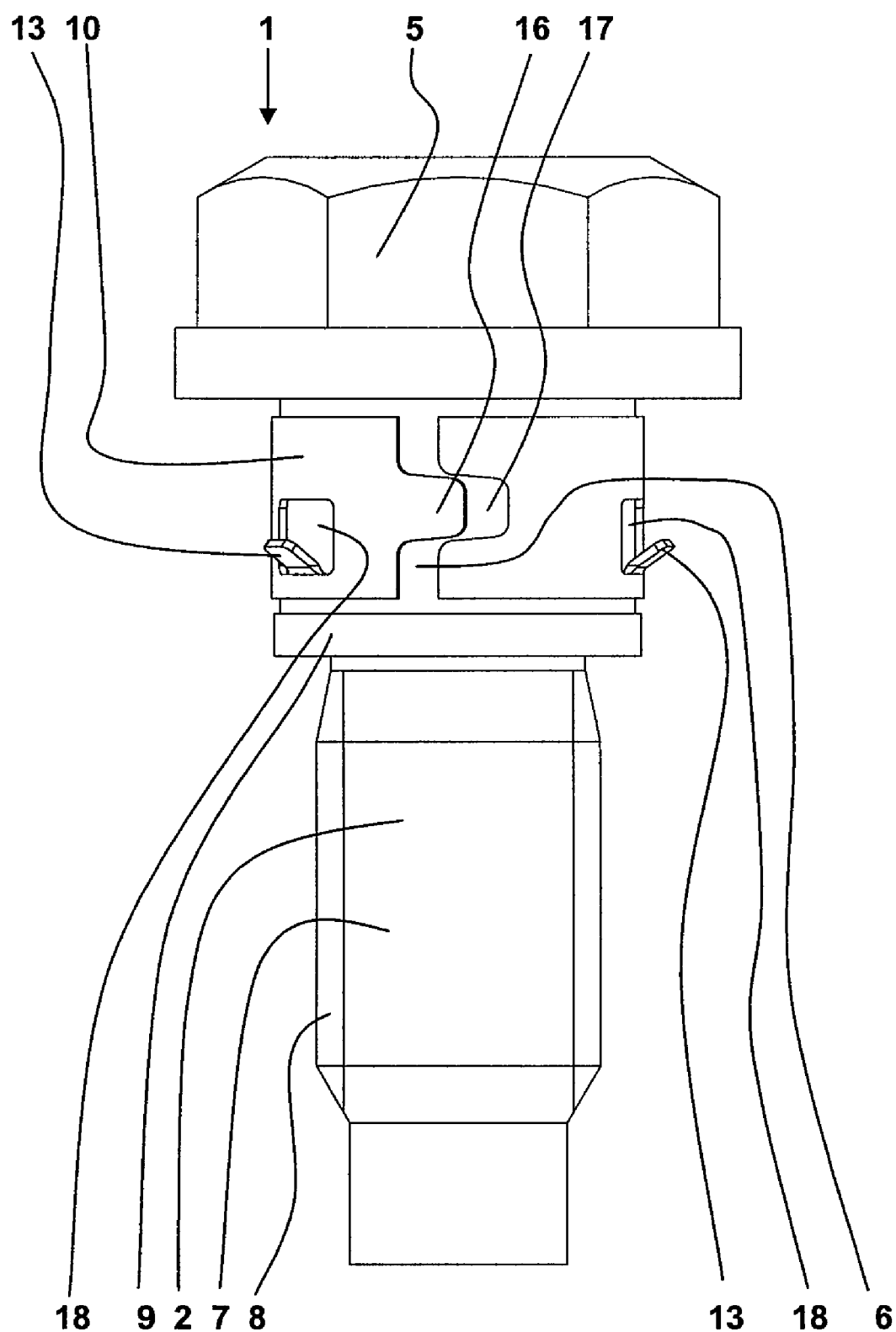
FIG. 19 is a first side view of a third exemplary embodiment of the novel mounting unit.
Figure 20:
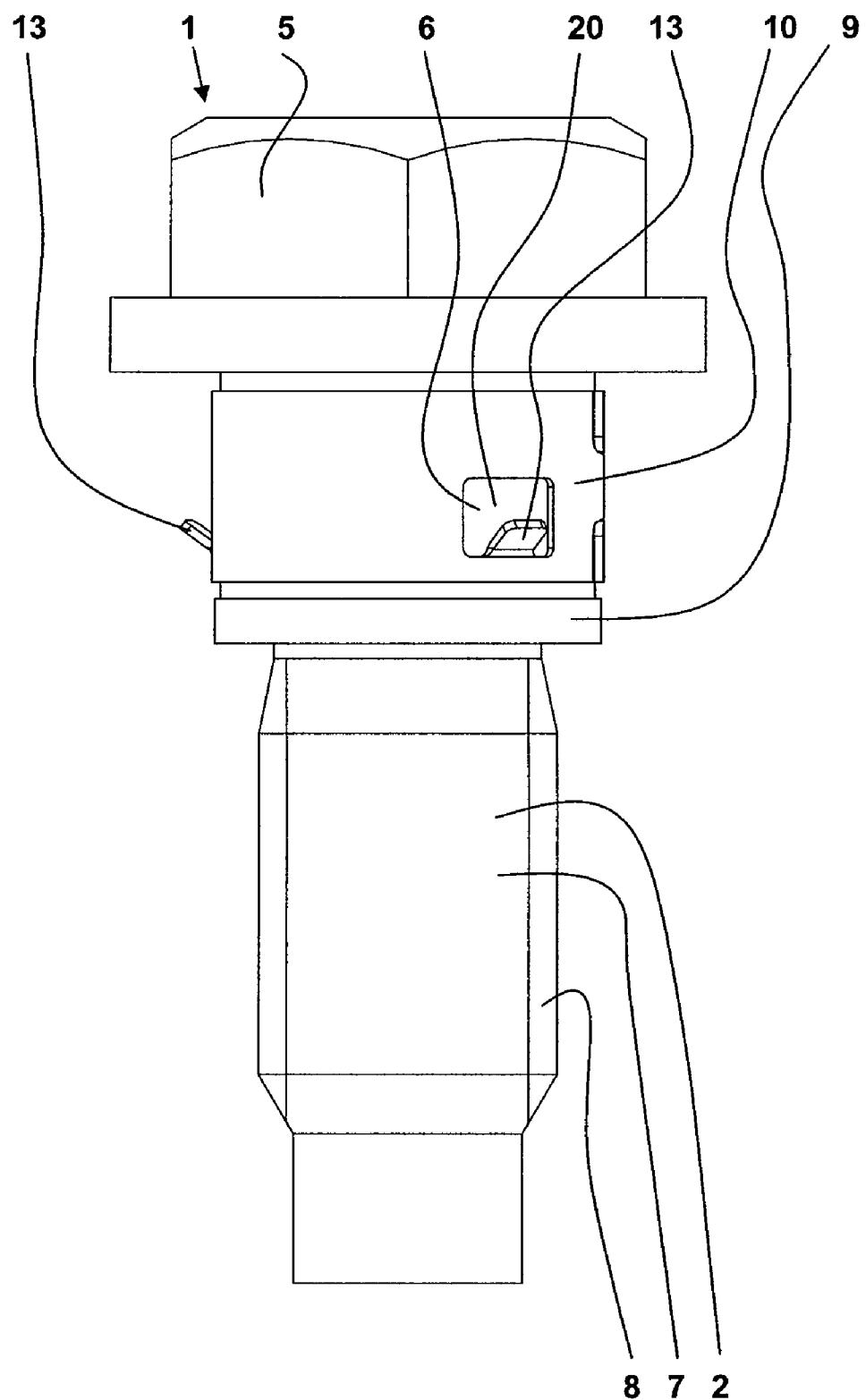
FIG. 20 is a second side view of the third exemplary embodiment of the novel mounting unit.
Figure 21:
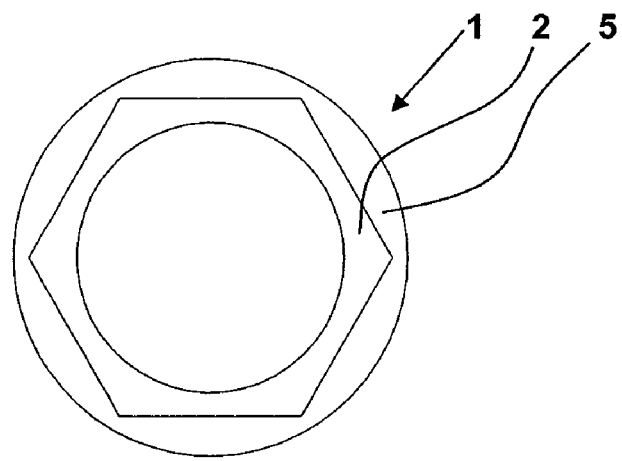
FIG. 21 is a top view of the third exemplary embodiment of the novel mounting unit.
Figure 22:
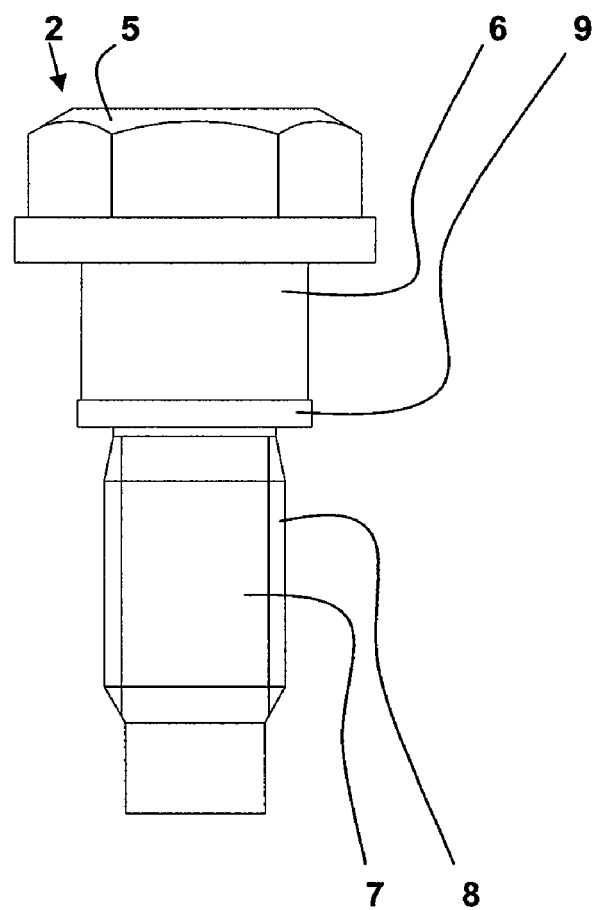
FIG. 22 is a side view of the screw of the third exemplary embodiment of the novel mounting unit.
Figure 23:
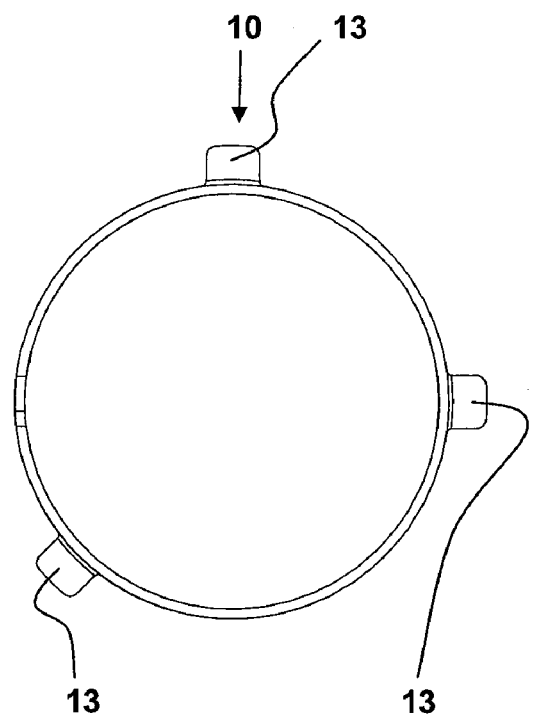
FIG. 23 is a top view of the mounting ring of the third exemplary embodiment of the novel mounting unit.
Figure 24:
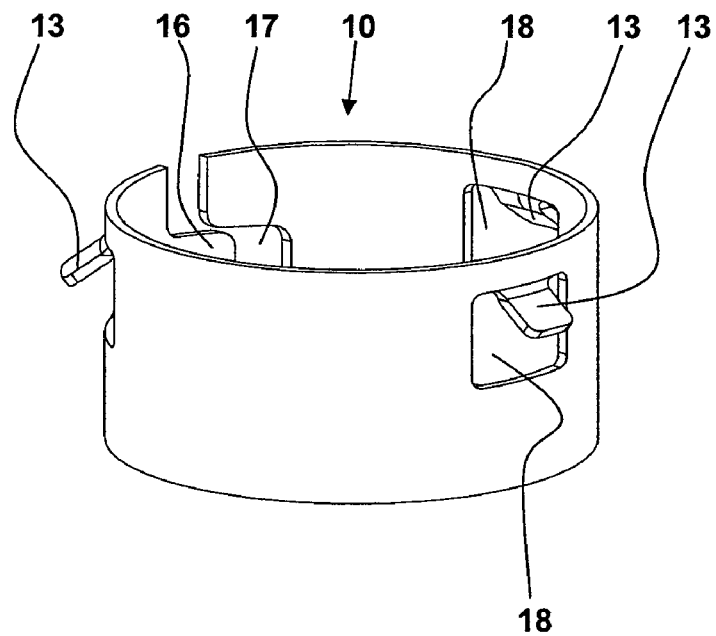
FIG. 24 is a perspective view of the mounting ring of the third exemplary embodiment of the novel mounting unit.
Figure 25:
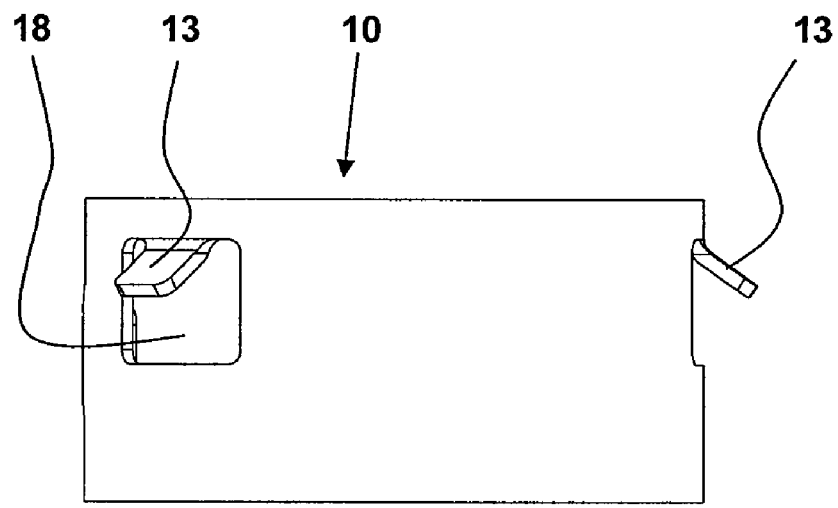
FIG. 25 is a first side view of the mounting ring of the third exemplary embodiment of the novel mounting unit.
Figure 26:
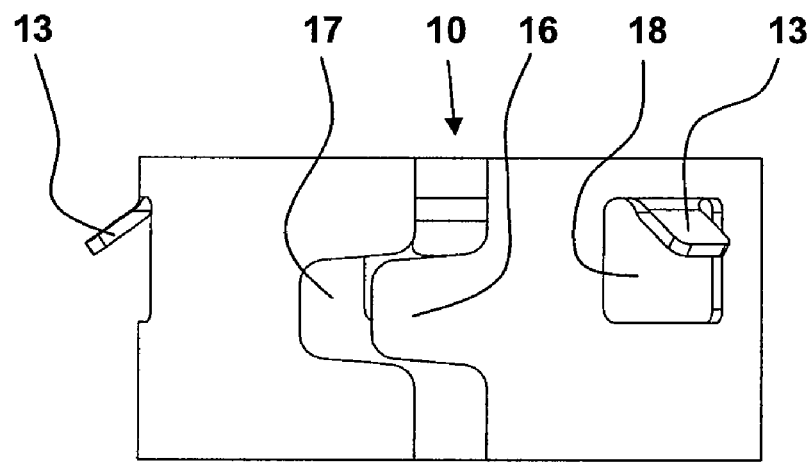
FIG. 26 is a second side view of the mounting ring of the third exemplary embodiment of the novel mounting unit.

FIGS. 1-10 illustrate different views of a first exemplary embodiment of a novel mounting unit 1. The mounting unit 1 serves to rotatably and captively fasten a screw 2 to a mounting part 3.

In the illustrated example, the mounting part 3 is a fastening eyelet 4 of a belt buckle of an automobile, a truck, a commercial vehicle or a different vehicle. As it is known, such a fastening eyelet 4 serves to fasten the belt buckle in the interior of the vehicle. The fastening eyelet 4 includes a bore 15 into which a section of the belt engages to which the actual belt buckle (not illustrated) is connected. However, it is also possible to use any other mounting element 3 which can be fastened and mounted in the below described way.

The screw 2 of the mounting unit 1 includes a head 5. The head 5 includes engagement surfaces which serve to actuate the screw. The engagement surfaces may have any design. In the illustrated example, the engagement surfaces are designed such that the screw 2 is a hexagon head screw. The screw 2 furthermore includes a shank portion 6 and a threaded portion 7 with a thread 8. The thread 8 may be any kind of thread. In the illustrated example, the thread 8 is a metric outer thread. The thread 8 may extend to the free end of the screw, or it may end earlier such that it does not extend to the free end. In the illustrated example, the screw 2 at its end includes a centering portion not including a thread. It is also possible to arrange a plurality of threaded portions 7 and also other portions along the screw 2. The shank portion 6 with its upper end is located next to the head 5 of the screw 2. Instead, there could also be another portion between the shank portion 6 and the head 5 of the screw 2. At its end facing away from the head 5, in this embodiment of the screw 2, the shank portion 6 is located next to a shoulder 9 having a greater outer diameter than the shank portion 6.

A mounting ring 10 is arranged on the shank portion 6. The mounting ring 10 is arranged on the shank portion 6 to be substantially not movable in the direction of the screw axis 11. In the illustrated example of the mounting unit 1 and of the mounting ring 10, respectively, the arrangement of the mounting ring 10 to be substantially not movable is realized by the mounting ring 10 having a smaller diameter than the shoulder 9 and by its size being coordinated with the size of the shank portion 6. For the purpose of assembly, the mounting ring 10 in this case is designed as a ring which is not closed in the circumferential direction. Especially, it is made of spring steel. It includes a tongue 16 and a corresponding recess 17 such that it can be pushed over the threaded portion 7 and the shoulder 9 into the region of the shank portion 6 under elastic widening. Due to the elastic retaining forces, the diameter of the mounting ring 10 there diminishes when it is freed from forces. In some way, it engages the undercut formed by the shank portion 6 behind the shoulder 9. However, other designs of the mounting ring 10 are also possible.

The mounting ring 10 in its end portion facing the head 5 of the screw 2 includes a plurality of pressing elements 12. However, it is also possible that there is only one pressing element 12 or no pressing element at all. In the illustrated example, the pressing elements 12 are material sections protruding from the annular outer surface of the mounting ring 10. The material sections are designed such that they exercise a resilient force such that the mounting ring 10 is clamped between the head 5 and the shoulder 9 without play or clearance and without rattle noises.

The mounting ring 10 furthermore includes a plurality of spaced apart retaining elements 13. However, it could also include only one retaining element 13. In the illustrated example, the retaining elements 13 are uniformly distributed about the circumference of the mounting ring 10. The retaining elements 13 are designed and arranged in a way that the mounting part 3 with its circumferentially closed bore 14 can be pushed over and beyond the retaining elements 13 such that it can be fastened on the mounting ring 10 by the retaining elements 13 such that the screw 2 is arranged such that it is rotatable with respect to the mounting part 3, but not to be movable in the direction of the screw axis 11.

In the illustrated first example, the retaining elements 13 are designed as elastic snap elements. The retaining elements 13 are formed by the material of the mounting ring 10, and they protrude from the outer surface of the mounting ring 13 in an outward direction, their free end facing in the direction towards the head 5 of the screw 2. For this design, the mounting ring 10 includes punches 18 allowing for the above described design of the retaining elements 13. The retaining elements 13 protrude from the punches 18. However, other kinds of the design and arrangement of the retaining elements 13 are also possible. When producing the mounting ring 10, the retaining elements 13 are produced by bending them away from the surface of the mounting ring 10 under elastic and plastic deformation. In this way, they protrude from the mounting ring 10 in the desired way and at the desired angle, for example approximately 30°. When the mounting part 3 with its inner surface contacts the retaining elements 13 during assembly when pushing the mounting part 3 in the direction towards the head 5 of the screw 2, the retaining elements 13 are elastically deformed back towards the annular surface of the mounting ring 10. After the mounting part 3 has been further pushed in the direction towards the head 5 of the screw 2 and it has released the retaining elements 13, the retaining elements 13 elastically snap back, and they fasten the mounting part 3 as this is to be especially seen in FIG. 9. The retaining elements 13 thus contact the lower surface of the mounting part 3, while the upper surface of the mounting part 3 is pressed by the resilient pressing elements 12 towards the retaining elements 13. In this way, the mounting part 3 is securely fixed on the mounting ring 10 without clearance or play. In this way, undesired movement of the mounting part 3 with respect to the screw 2 in the direction of the screw axis 11 is effectively prevented.

At the same time, the mounting part 3 is still movable and pivotable, respectively, with respect to the screw 2. In the present example, the mounting ring 10 is rotatable with respect to the screw 2 as well as the mounting part 3 is rotatable with respect to the mounting ring 10. However, other arrangements are also possible as long as they allow for relative rotation between the screw 2 and the mounting element 3.

In the position of the mounting unit 1 fixedly arranged in the mounting part 3, these elements together form a mounting set 19. The mounting set 19 may be preassembled, and it can be transported to reach the region of the component without the danger of losing elements. Finally, the mounting set 19 is mounted to the component. In this way, one advantageously attains economic assembly of the mounting set 19.

FIGS. 11-18 show respective illustrations of a second exemplary embodiment of the novel mounting unit 1. It is to be understood that this mounting unit 1 can also be mounted to the mounting part 3 illustrated in FIGS. 9, 10 or any other mounting part for attaining a mounting set 19.

The mounting unit 1 according to FIGS. 11-18 has a lot in common with the mounting unit 1 according to FIGS. 1-10. Consequently, it is referred to the above description.

In contrast, the screw 2 does not include a shoulder having a greater diameter, but instead a continuous channel 20. Instead of the continuous channel 20, it is also possible to arrange spaced apart impressions and the like. In the later case, the mounting ring 10 may be arranged on the shank 6 of the screw 2 such that it cannot be rotated with respect to the shank 6. Consequently, the required relative rotation in this case takes place between the mounting part 3 and the mounting ring 10. To axially secure the mounting ring 10 in the region of the shank portion 6, the mounting ring 10 includes a plurality of corresponding fixing elements 21 engaging the channel 20. However, it is also possible to only arrange one single fixing element. In the illustrated example, the fixing elements 21 are sections of the mounting ring 10 protruding into the interior of the mounting ring 10. Especially, the fixing elements 21 are especially impressions in the surface of the mounting ring 10.

FIGS. 19-26 illustrate a third exemplary embodiment of the novel mounting unit 1. Once again, with respect to the common features, it is referred to the above descriptions. In the present case, a special feature is that the mounting ring 10 does not include pressing elements.

Figure 27:
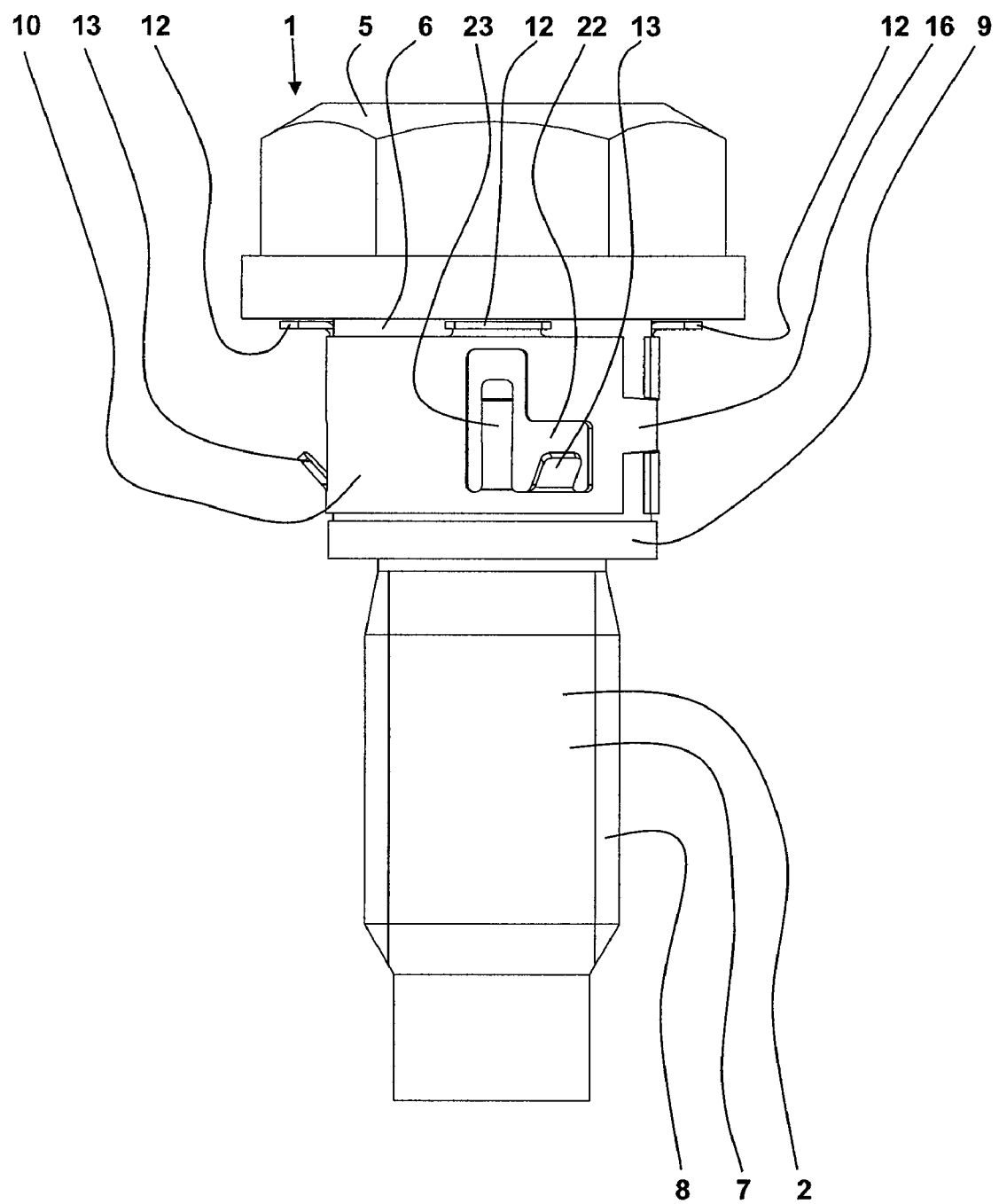
FIG. 27 is a first side view of a fourth exemplary embodiment of the novel mounting unit.
Figure 28:
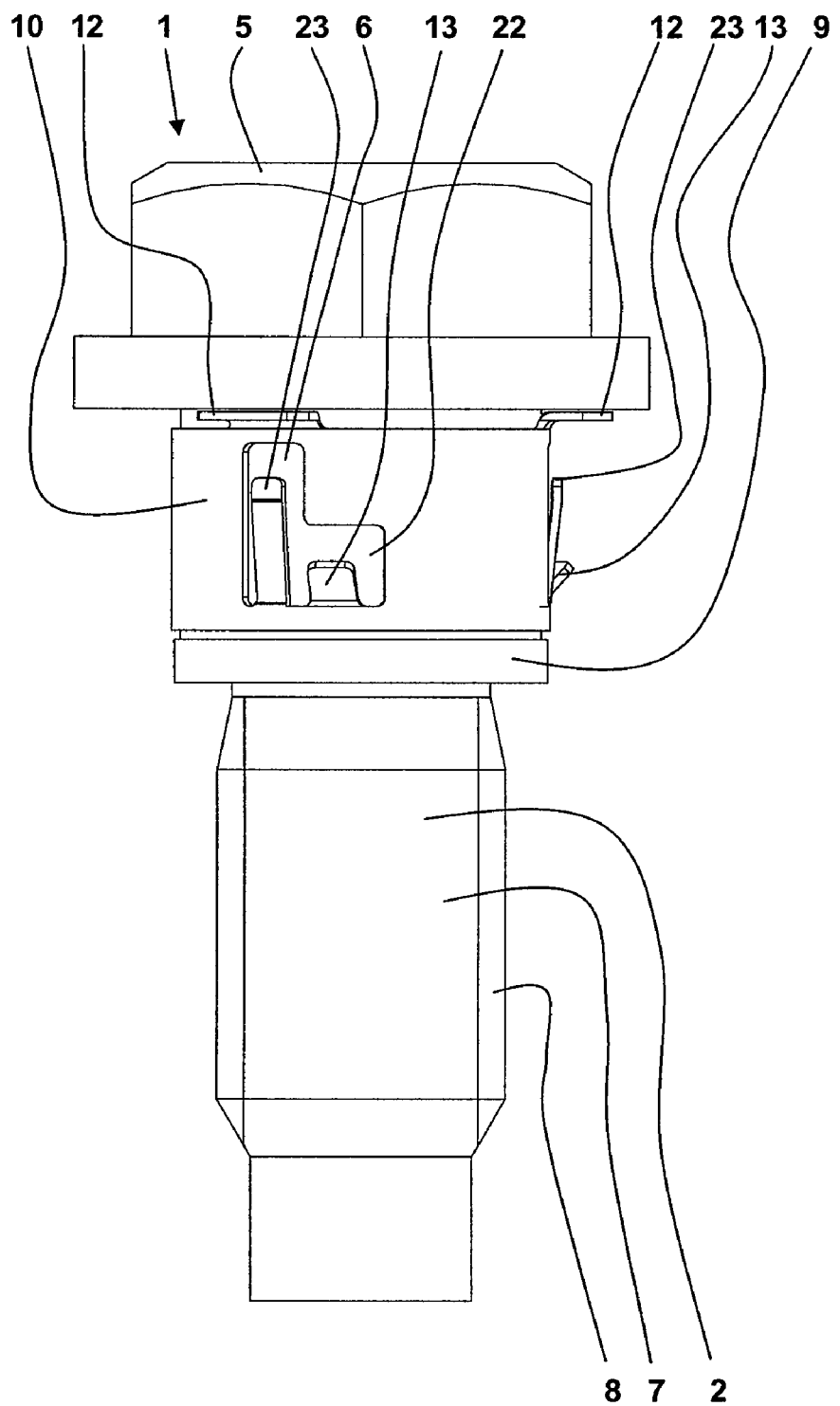
FIG. 28 is a second side view of the fourth exemplary embodiment of the novel mounting unit.
Figure 29:
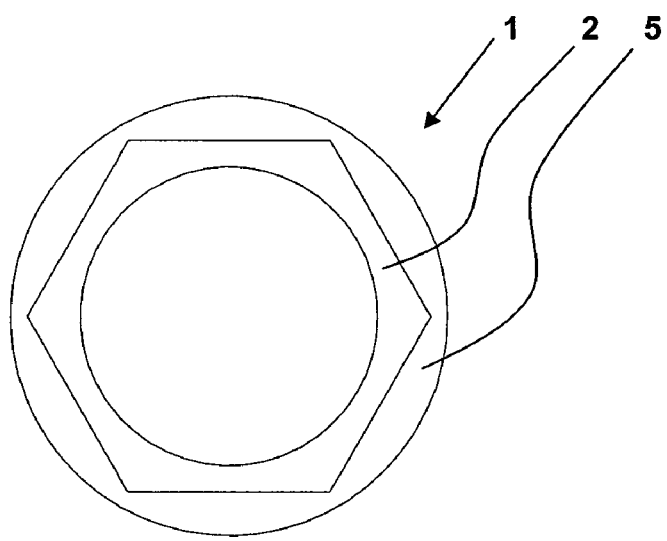
FIG. 29 is a top view of the fourth exemplary embodiment of the novel mounting unit.

FIGS. 27-29 illustrate a fourth exemplary embodiment of the novel mounting unit 1. With respect to the corresponding features, it is referred to the above descriptions and especially to the one relating to the first embodiment of the mounting unit 1. In the present fourth example, the mounting ring 10 includes an L-shaped punching 22 from which in addition to the retaining element 13 another element 23 protrudes. The element 22 has the object of compensating unpreventable play or clearance between the outer diameter of the mounting ring 10 and the inner diameter of the bore 14 of the mounting part 3 due to tolerances, and to prevent potential rattling noises. The plurality of elements 23 being spaced apart the circumference thus contact the inner diameter of the bore 14 of the mounting part 3.

Figure 30:
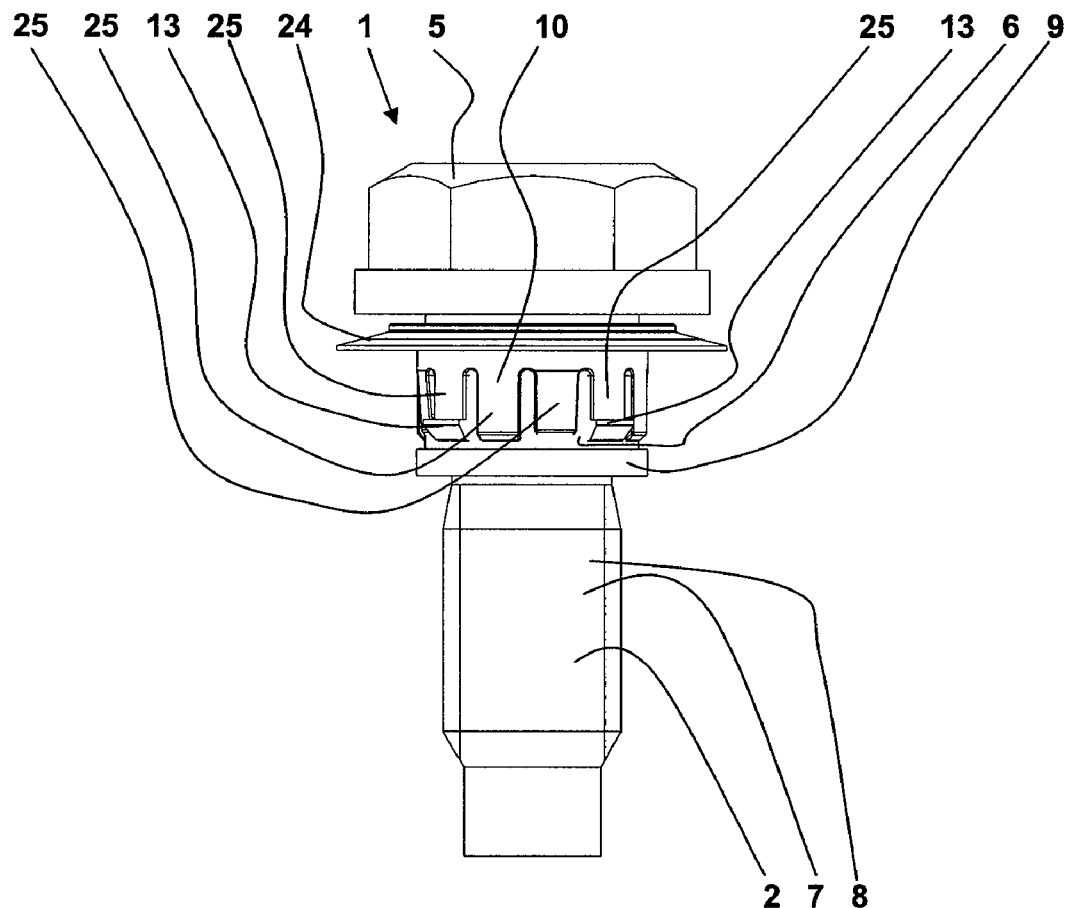
FIG. 30 is a first side view of a fifth exemplary embodiment of the novel mounting unit.
Figure 31:
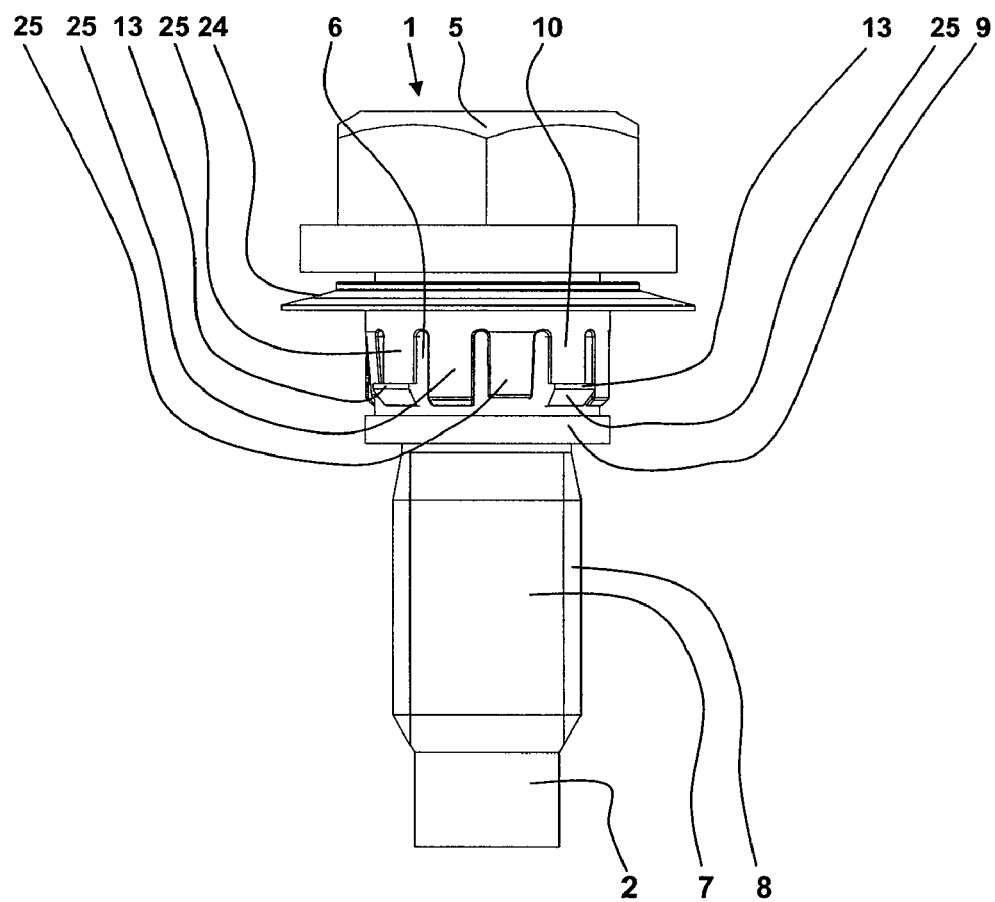
FIG. 31 is a second side view of the fifth exemplary embodiment of the novel mounting unit.
Figure 32:
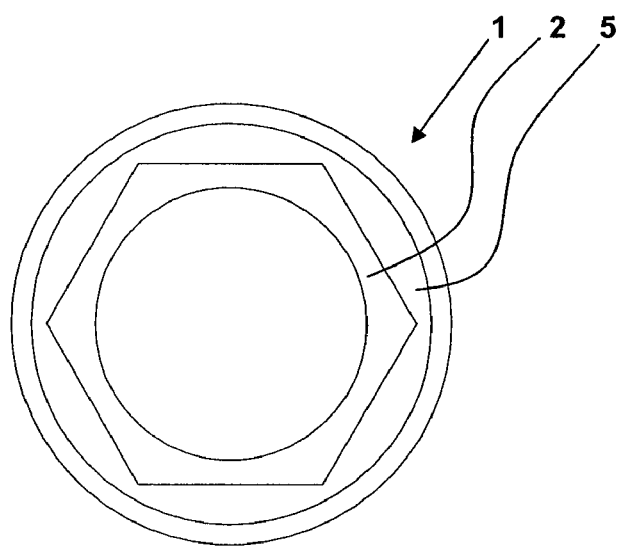
FIG. 32 is a top view of the fifth exemplary embodiment of the novel mounting unit.

FIGS. 30-32 finally illustrate a fifth exemplary embodiment of the novel mounting unit 1. In this case, the mounting ring 10 includes a collar 24. A plurality of claw-shaped fixing elements 25 serve for fastening the mounting ring 10 to the shank portion 6 of the screw 2. The mounting ring 10 is arranged on the shank 6 of the screw 2 with some play or clearance. Due to the fact that the mounting ring 10 in this case is especially designed as a ring made of plastic and is comparatively firmly located on the surface of the shank portion 6 due to its fixing elements 25, this play or clearance is not disadvantageous since there cannot be rattling noises. Undesired axial removal of the mounting ring 10 in the direction of the free end of the screw 2 is reliably prevented by the shoulder 9.

We claim:

1. A mounting unit for rotatably and captively fastening a screw to a mounting part, comprising:
    a screw having a screw axis and including a head, a shank portion and a threaded portion including a thread, said shank portion being arranged in a region between said head and said threaded portion; and
    a mounting ring, said mounting ring being arranged on said shank portion in a way not to be movable in a direction of the screw axis, said mounting ring including at least one retaining element being designed and arranged such that a mounting part can be pushed over and beyond said retaining element in a way that said mounting part can be fastened by said retaining element such that said screw is arranged to be rotatable with respect to said mounting part and not to be movable in the direction of the screw axis, wherein said mounting ring includes at least one pressing element, said at least one retaining element being arranged adjacent an axial end of said mounting ring facing said threaded portion and said at least one pressing element being arranged in a region of an axial end of said mounting ring facing said head such that said mounting part can be fastened between said at least one pressing element and said at least one retaining element without axial play.

2. The mounting unit of claim 1, wherein said at least one retaining element is designed as a snap element, said snap element being designed to be elastic and to protrude from said mounting ring in a way that said mounting part can be pushed over and beyond said snap element under elastic deformation and such that said mounting part can be fastened by said snap element after elastic springback of said snap element.

3. The mounting unit of claim 2, wherein said mounting ring includes at least one pressing element, said at least one retaining element being arranged in a region of an axial end of said mounting ring facing said threaded portion and said at least one pressing element being arranged in a region of an axial end of said mounting ring facing said head such that said mounting part can be fastened between said at least one pressing element and said at least one retaining element without axial play.

4. The mounting unit of claim 1, wherein said at least one pressing element is designed to be elastic and to apply a resilient force onto said mounting part such that said mounting part in a mounted position is pressed against said at least one retaining element.

5. The mounting unit of claim 3, wherein said at least one pressing element is designed to be elastic and to apply a resilient force onto said mounting part such that said mounting part in a mounted position is pressed against said at least one retaining element.

6. The mounting unit of claim 1, wherein said mounting ring is designed as a ring which is not closed in a circumferential direction.

7. The mounting unit of claim 1, wherein said screw includes a shoulder, said shoulder in the direction of the screw axis towards said threaded portion being located next to said shank portion, and said shoulder having a greater outer diameter than said shank portion.

8. The mounting unit of claim 1, wherein said screw includes a channel being arranged in a region of said shank portion, and wherein said mounting ring includes at least one corresponding fixing element being designed and arranged to engage said channel.

9. The mounting unit of claim 1, wherein said shank portion has a greater outer diameter than said threaded portion.

10. The mounting unit of claim 1, wherein said mounting part is designed as a fastening eyelet of a belt buckle of a vehicle.

11. A mounting set connecting a mounting part to a component by screwing, comprising:
a mounting part including a bore;
a screw having a screw axis and including a head, a shank portion and a threaded portion including a thread, said shank portion being arranged in a region between said head and said threaded portion, said screw extending through said bore of said mounting part; and
a mounting ring, said mounting ring being arranged on said shank portion in a way not to be movable in a direction of the screw axis, said mounting ring including at least one retaining element being designed and arranged such that said mounting part is fastened by said retaining element such that said screw is arranged to be rotatable with respect to said mounting part and not to be movable in the direction of the screw axis, wherein said mounting ring includes at least one pressing element, said at least one retaining element being arranged adjacent an axial end of said mounting ring facing said threaded portion and said at least one pressing element being arranged in a region of an axial end of said mounting ring facing said head such that said mounting part can be fastened between said at least one pressing element and said at least one retaining element without axial play.

12. The mounting set of claim 11, wherein said at least one retaining element is designed to be elastic and to protrude from said mounting ring in a way that said mounting part starting from an unmounted position can be pushed over and beyond said retaining element under elastic deformation of said retaining element and that said mounting part can be fastened by said retaining element after elastic springback of said retaining element.

13. The mounting set of claim 11, wherein said mounting ring includes at least one pressing element, said at least one retaining element being arranged in a region of an axial end of said mounting ring facing said threaded portion and said at least one pressing element being arranged in a region of an axial end of said mounting ring facing said head such that said mounting part is fastened between said at least one pressing element and said at least one retaining element without axial play.

14. The mounting set of claim 12, wherein said mounting ring includes at least one pressing element, said at least one retaining element being arranged in a region of an axial end of said mounting ring facing said threaded portion and said at least one pressing element being arranged in a region of an axial end of said mounting ring facing said head such that said mounting part is fastened between said at least one pressing element and said at least one retaining element without axial play.

15. The mounting set of claim 13, wherein said pressing element is designed to be elastic and to apply a resilient force onto said mounting part such that said mounting part is pressed against said at least one retaining element.

16. The mounting set of claim 11, wherein said mounting part is designed as a fastening eyelet of a belt buckle of a vehicle.

17. A mounting unit for rotatably and captively fastening a screw to a mounting part, comprising:
a screw having a screw axis and including a head, a shank portion and a threaded portion including a thread, said shank portion being arranged in a region between said head and said threaded portion; and
a mounting ring, said mounting ring being arranged on said shank portion in a way not to be movable in a direction of the screw axis, said mounting ring including at least one retaining element, said retaining element being made of the material of said retaining ring, said retaining element being designed and arranged to protrude from said mounting ring in an outer direction, said retaining element being designed and arranged to be elastically bendable towards an inner direction such that a mounting part can slide over said retaining element in a way that said mounting part is fastened by said retaining element such that said screw is arranged to be rotatable with respect to said mounting part and not to be movable in the direction of the screw axis, wherein said mounting ring includes at least one pressing element, said at least one retaining element being arranged adjacent an axial end of said mounting ring facing said threaded portion and said at least one pressing element being arranged in a region of an axial end of said mounting ring facing said head such that said mounting part can be fastened between said at least one pressing element and said at least one retaining element without axial play.

18. The mounting unit of claim 17, wherein said mounting ring is designed not to be closed in a circumferential direction.

* * * * *